Patented Jan. 12, 1954

2,665,850

UNITED STATES PATENT OFFICE 2,665,850

COMMINUTED PRODUCT AND METHOD OF GRINDING

Sol B. Wiczer, Washington, D. C.

No Drawing. Application July 25, 1950, Serial No. 175,885

11 Claims. (Cl. 241—23)

This invention relates to finely comminuted organic products of amorphous thermoplastic character, such as rubber, wax, asphalt, pitch, soap, resin and similarly low fusing temperature natural and synthetic products and to a method of forming the same.

In my co-pending application Serial No. 699,355, now Patent No. 2,516,166 issued July 25, 1950, of which the present application is a continuation-in-part I have disclosed the preparation of a refrigerant in the form of a snow made by comminution of ordinary ice with Dry Ice. I have now found that an analogous method is operative to convert thermoplastic organic bodies to a similar snow-flake like form.

The product hereof is a mixture of finely mixed particles ranging from dust to flakes, which are pourous as to be of a filmy, spongy snowflake-like character of fine particle size, averaging less than about 10 mesh. The product produced is usually free flowing and non-packing as to be a superior form as compared to heretofore available comminuted thermoplastic products.

In ordinary grinding methods heretofore practiced to comminute thermoplastic products, such products as soap, asphalt, etc. have tended to fuse under the heat and pressure applied by grinding rolls, and have tended to gum up the apparatus by fusion.

According to the present method the thermoplastic product, with or without prior refrigeration is simultaneously preliminarily crushed with Dry Ice, or other solid refrigerant product, and the large fragmentary crushed mixture is then further comminuted by sharp macerating blades while they are picked up and suspended by a cold blast of gas such as air, whereby a fine porous filmy product of snowflake-like character in a highly refrigerated state is produced.

In contrast to ordinary grinding methods, the thermoplastic organic body whether or not pre-chilled is crushed together with Dry Ice to form a homogeneous brittle fragmentary coarse mixture thereof. Such mixture is then allowed to fall upon the rapidly rotating comminuting blades of a typical blower ice machine construction, as shown in my parent application, or U. S. Patents 2,114,557 and 2,416,432, where the blades further macerate the extremely cold brittle preliminarily crushed mixture to extremely finely divided form, while entraining and blowing a gas therethrough, obtained from an extraneous source or drawn from the opening of the crusher of the first crushing step. Such gas suspends the finely divided product, so that the rapidly rotating blades continue to macerate the fine fragments suspended therein, the gas serving to ultimately convey the finely comminuted usually snowflake-like mixture from the apparatus as a snow blizzard.

Without intending to be limited by any theory of operation, it is believed that the crushing and cutting by the edges of the cutting blades tends to shear larger particles into smaller ones, but the shearing force under normal warm conditions would be sufficient to fuse the thermoplastic organic product. However, the product continually fused by continuous cutting and continuously cooled by body contact with fine particles of Dry Ice, continuously refreezes and, as suspended in a cold gaseous medium provided by rapidly evaporating Dry Ice or other similar refrigerant, acquires the fine fluffy character of the product hereof.

This fine snowflake-like product ultimately blown from the apparatus, deposits in a pile, or fills any suitable large bin or receptacle from which the Dry Ice ultimately evaporates leaving the organic product in the fine porous and usually free flowing form hereinabove described.

EXAMPLE I

Smoked sheet rubber is fed to a blower-ice machine of standard commercial type as a laminate of equal proportions by weight with slabs of Dry Ice to a rotating drum crusher of a blower ice machine, whereby the sheet rubber is pre-chilled by contact with the Dry Ice to a temperature of about minus 100° F. and the large assembled Dry Ice and sheet rubber bodies are cut into small dime-size fragments of highly brittle pieces of rubber together with similarly sized fragments of Dry Ice. The preliminarily crushed mixture is allowed to fall on the sharp, rapidly rotating blades of a fan type blower, which further comminutes the large brittle particles thereof to the form herein described, the blower simultaneously drawing a blast of air, whereby the particles remain suspended while being struck and cut continuously by several blower blades rotating at a rate of about 1000 to 2500 R. P. M. The product blown from the machine, after warming to normal air temperature is the finely comminuted free flowing flaky porous body herein described.

EXAMPLE II

Cakes of micro-crystalline paraffin wax melting in the range of 165 to 185° F. are simultaneously crushed with cakes of Dry Ice in proportion of about 40% by weight of Dry Ice and 60% by weight of wax. As described in Example I the product obtained is a fine free flowing wax product.

EXAMPLE III

Large blocks of neutral soap comprising substantially pure sodium stearate are mixed with an equal proportion by weight of Dry Ice and similarly crushed simultaneously therewith as described in Example I, to obtain a highly porous free flowing particulate soap product.

EXAMPLE IV

Hard pitch, having a softening point of about 125 to 175° F. is crushed with Dry Ice as described in the previous examples using 30% of Dry Ice by weight to obtain a similarly free flowing product. Similarly asphalt, rosin, and synthetic low thermo fusing resins such as alkyds, polystyrenes, vinyls, linear poly amides, polyterpenes and synthetic rubbers may be reduced to particulate free flowing form by the method of this example.

For some products preliminarily refrigerated by other means, as little as 10% of Dry Ice may be used in the coarse crushing. With larger quantities of Dry Ice preliminary refrigeration is unnecessary. In general 10 to 150%, preferably 50 to 100% by weight of Dry Ice is crushed with the thermoplastic substance to be comminuted.

I claim:

1. Method of comminuting low thermoplastic solid bodies into finely divided free flowing particles comprising first rough crushing the solid with Dry Ice to form a coarse fragmentary mixture of thermo fusing solid and Dry Ice and then macerating the mixture while suspending the same in a gas.

2. The method as defined in claim 1 wherein the solid is a substance selected from the group consisting of thermoplastic resins, pitches, waxes, rubbers and soaps.

3. The method of comminuting a thermoplastic body selected from the group consisting of resins, pitches, waxes, rubbers and soaps comprising simultaneously crushing the same with solid Dry Ice in a blower ice machine wherein the solid is first rough crushed and then macerated and suspended in a gas.

4. A solid snowflake-like finely comminuted porous thermoplastic body selected from the group consisting of resins, rubbers, soaps, pitches and waxes formed by first rough crushing the solid thermoplastic body with Dry Ice and then macerating the coarse crushed mixture while suspending the same in a blast of gas.

5. Soap in the form of porous snowflakes formed by first crushing large fragments thereof with Dry Ice and then macerating the coarse crushed mixture while suspending the same in a blast of gas.

6. Thermoplastic resin in the form of porous snowflakes formed by first crushing large fragments thereof with Dry Ice and then macerating the coarse crushed mixture while suspending the same in a blast of gas.

7. Rubber in the form of porous snowflakes formed by first crushing large fragments thereof with Dry Ice and then macerating the coarse crushed mixture while suspending the same in a blast of gas.

8. Pitch in the form of porous snowflakes formed by first crushing large fragments thereof with Dry Ice and then macerating the coarse crushed mixture while suspending the same in a blast of gas.

9. Wax in the form of porous snowflakes formed by first crushing large fragments thereof with Dry Ice and then macerating the coarse crushed mixture while suspending the same in a blast of gas.

10. The method of comminuting thermoplastic substances comprising precooling the thermoplastic substance, rough crushing the same with at least 10% by weight of Dry Ice to form a coarse mixture of fragments of thermoplastic and Dry Ice and then further macerating the fragments while simultaneously passing a blast of gas into the macerating zone to suspend the fine particles.

11. A solid snowflake-like finely comminuted porous organic thermoplastic body formed by rough crushing a solid organic thermoplastic body with large fragments of Dry Ice and then macerating the coarse crushed mixture while suspending the same in a blast of gas.

SOL B. WICZER.

References Cited in the file of this patent

UNITED STATES PATENTS

| Number | Name | Date |
|---|---|---|
| 226,057 | Gerner | Mar. 30, 1880 |
| 637,465 | Hutchinson | Nov. 21, 1899 |
| 677,012 | Benjamin | June 25, 1901 |
| 1,129,868 | Hoy | Mar. 2, 1915 |
| 1,431,676 | Miller | Oct. 10, 1922 |
| 1,979,124 | Tival | Oct. 30, 1934 |
| 2,062,374 | Noel | Dec. 1, 1936 |
| 2,114,557 | Davis | Apr. 19, 1938 |
| 2,142,592 | Waligore | Jan. 3, 1939 |
| 2,253,608 | Bruce | Aug. 26, 1941 |
| 2,301,595 | Washburn | Nov. 10, 1942 |
| 2,318,693 | Joyce et al. | May 18, 1943 |
| 2,347,464 | Cuno | Apr. 25, 1944 |
| 2,411,152 | Folsom | Nov. 19, 1946 |
| 2,416,432 | Brady | Feb. 25, 1947 |
| 2,499,359 | Cox | Mar. 7, 1950 |
| 2,516,166 | Wiczer | July 25, 1950 |

FOREIGN PATENTS

| Number | Country | Date |
|---|---|---|
| 217,325 | Germany | Dec. 27, 1909 |